United States Patent

Gorthala et al.

[11] Patent Number: 6,007,655
[45] Date of Patent: Dec. 28, 1999

[54] APPARATUS FOR AND METHOD OF PRODUCING THICK POLYMERIC COMPOSITES

[76] Inventors: Ravi Gorthala, 753 Classon Ave, #7F, Brooklyn, N.Y. 11238; Daniel R. Flynn, Rts. 723 and 255, Millwood, Va. 22646

[21] Appl. No.: 08/861,713

[22] Filed: May 22, 1997

Related U.S. Application Data

[60] Provisional application No. 60/018,294, May 24, 1996.

[51] Int. Cl.⁶ .................................................. B29C 43/22
[52] U.S. Cl. ......................... 156/166; 156/167; 156/180; 264/245; 264/250; 264/251; 264/290; 264/294
[58] Field of Search ..................................... 156/166, 167, 156/180; 264/245, 250, 251, 294, 290

[56] References Cited

U.S. PATENT DOCUMENTS 5,026,447  6/1991  O'Connor ................................ 156/166
5,593,536  1/1997  Kaiser ...................................... 156/433

*Primary Examiner*—Richard Weisberger
*Attorney, Agent, or Firm*—Evenson, McKeown, Edwards & Lenahan, P.L.L.C.

[57] ABSTRACT

A method, apparatus, and pultruded product formed by adding resin coated fibers at each of successive heated dies having respectively larger die openings to build up a composite pultruded product in stages. Each successive pultruded layer is cured at an exterior surface by heat from the die wall and at an interior surface by heat from the cured product emerging from the previous heated die. By forming the pultruded product in layers, higher line speeds, and a higher quality product which is consistently cured throughout its cross-section are achieved. Hybrid composites can be produced by varying the fiber type and/or the resin type in one or more stages.

12 Claims, 3 Drawing Sheets

APPARATUS FOR AND METHOD OF PRODUCING THICK POLYMERIC COMPOSITES

This application claims the priority of provisional application Ser. No. 60/018,294, filed May 24, 1996 the disclosure of which is expressly incorporated by reference herein.

BACKGROUND AND SUMMARY OF THE INVENTION

This invention relates to method and apparatus for producing reinforced polymeric composites, as well as the product produced thereby. More specifically, this invention relates to a pultrusion process, commonly used for producing continuous and constant cross-section products, as well as for producing non-constant cross-section products. The invention is applicable to pultrusion of thermoset composites, as well as pultrusion of thermoplastic composites.

Typically, in a pultrusion process to manufacture polymeric composite products, the fibers (unidirectional, unidirectional with in-situ weaving, or woven mats) are drawn through a dip bath, where they become impregnated with the resin and then through a heated die which controls the shape and size of the product. As the material moves through the die, its outside surface is heated until it is effectively at the same temperature as the die. The core temperature, near the center of the product, will lag behind the die temperature by an amount that depends upon the part geometry and upon the effective thermal properties (thermal diffusivity, thermal conductivity, volumetric specific heat) of the resin/fiber mixture. As the temperature of the product rises, the rate of reaction of the exothermic curing process will increase rapidly, with attendant generation of heat. This is the characteristic of thermoset resins.

If the part is drawn through the die too rapidly, or if the die temperature is too low, the part will not cure completely. If the part thickness is large, it takes more time for the heat to conduct to the center of the part, which means the line speed must be reduced for proper curing of the product. In addition, for large thickness products, the heat generated due to exothermic reaction at the product center may not have time to conduct out, which may result in excessive temperatures inside the composite. These excessive temperatures can crack and delaminate the composite, thus damaging the composite part. Currently, for moderate thicknesses, preheating of the resin/fiber mass by RF heating is used. Where pultrusion of moderate thickness composites is possible, only conservative line speeds with limited productivity are used. Applications such as structural composites required in infrastructure demand much higher thicknesses, for which the current technology is not adequate.

An object of the invention is to provide a simple and modified pultrusion process and the corresponding apparatus for producing thicker cross-section polymeric composites which overcomes the limitations of the prior art as described above.

Another object of the invention is to increase the line speeds and hence the productivity.

Another object of the invention is to provide a process and apparatus for producing hybrid composites that can be tailored to different applications.

These and other objects have been achieved according to the present invention by providing a method of producing a pultruded product, comprising: pulling a first fiber coated with a first resin through a first heated die having a first die opening, a first product emerging from the first heated die; and subsequently pulling the first product and a second fiber coated with a second resin through a second heated die having a second die opening which is larger than the first die opening.

These and other objects have also been achieved according to the present invention by providing an apparatus for producing a pultruded product, comprising: a first heated die having a first die opening; a second heated die having a second die opening which is larger than the first die opening; a supply system which supplies a resin coated fiber to each of the heated dies; and a puller which pulls the resin coated fiber and a product emerging from each of said heated dies through subsequent of said heated dies.

These and other objects have also been achieved according to the present invention by providing a composite pultruded product, comprising: an first layer formed by pulling a first fiber coated with a first resin through a first heated die having a first die opening; a second layer formed by pulling the first layer and a second fiber coated with a second resin through a second heated die having a second die opening which is larger than the first die opening.

As mentioned above, this invention provides modification to the current pultrusion process. Also, as mentioned above, the limitation of the current process is the thickness of the product. There is a maximum thickness, depending upon the properties of the composite, above which it is neither practical nor feasible to produce composites with the current art. The present invention overcomes this limitation. Instead of pultruding the thick product in one stage, multiple stages are used to produce the product of final size with a practical thickness product cured in each stage. This allows the product to be pulled at the line speed that is practical for the optimum product thickness in each stage. This line speed will be much higher than that is possible in single-stage for producing the thick part. The process of the invention is still continuous. The apparatus governing the invention will include multiple heated die cavities with successively increasing cavity size. The apparatus can be an integrated pultrusion machine with the dies mounted on the same bed or multiple pultrusion machines assembled in series to produce the product of final dimensions.

The apparatus and the method can be effectively used for producing the hybrid composites, i.e., different fibers and different resins can be used for the same structure depending upon the application.

These and other objects, features and advantages of the present invention will become more readily apparent from the following detailed description when taken in conjunction with the accompanying drawings.

DETAILED DESCRIPTION OF THE DRAWINGS

Figure 1:
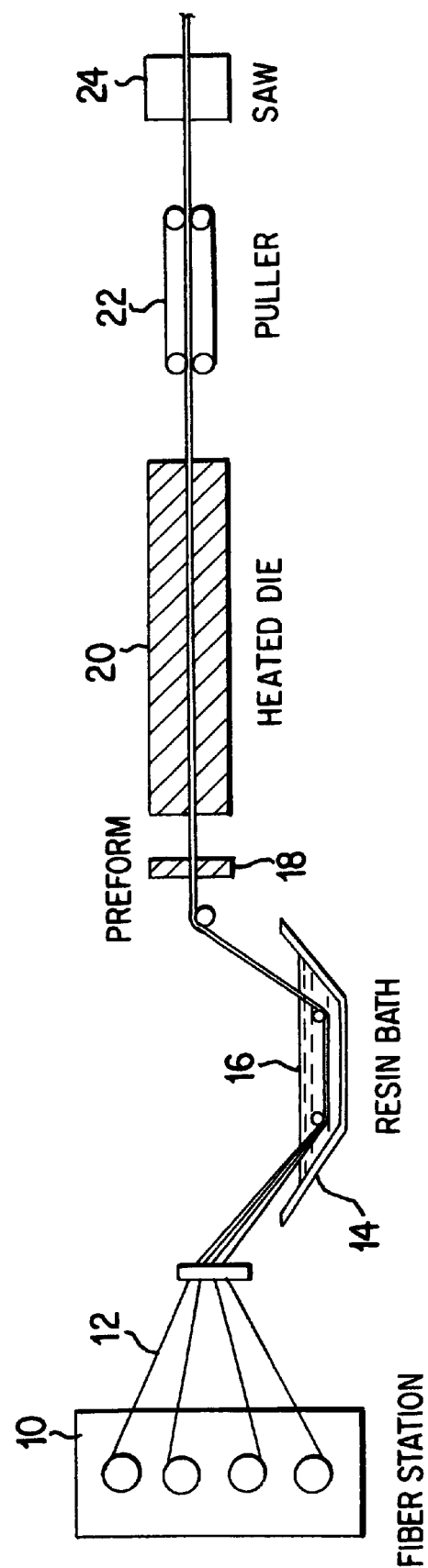
FIG. 1 is a schematic view of a pultrusion process for manufacturing polymeric composites.

A schematic diagram of a single stage pultrusion process is shown in FIG. 1. The typical components of the pultrusion apparatus are the fiber station 10 from which reinforcement fiber 12 (fiber rovings or fiber mats) are pulled, the resin bath 14 (or resin injection system) where the reinforcement fibers 12 are coated with the resin 16, the pre-form 18 which has near-final shape and dimensions, the heated die 20 which has been machined to the cross-sectional dimensions desired for the final product and provides heating for curing the product, the puller 22 required for drawing the fiber resin mass through the die, and finally the saw 24 to cut the cured product into desired lengths.

Figure 2:
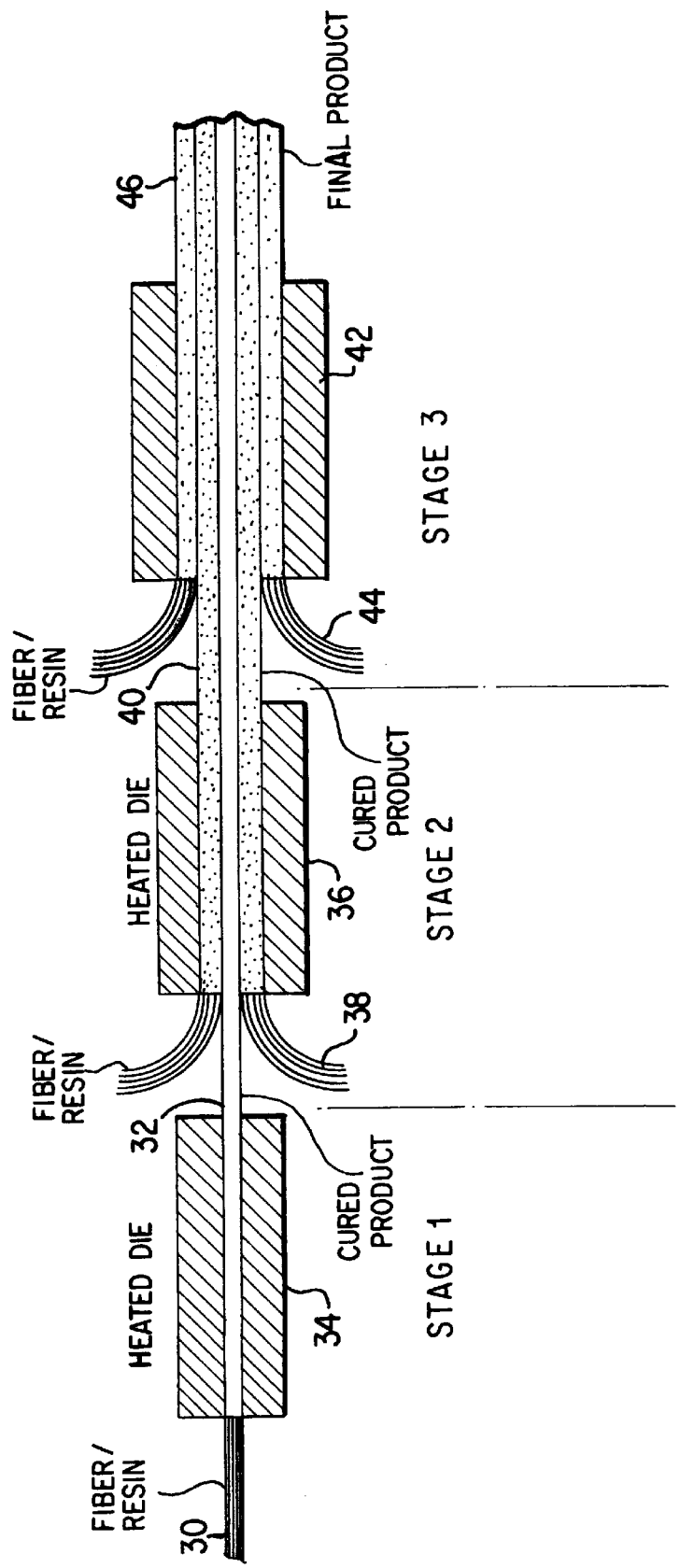
FIG. 2 is a schematic view depicting the apparatus for and method of producing large thickness composites in a staged pultrusion process, according to a preferred embodiment of the present invention.

A preferred embodiment of the present invention is schematically illustrated in FIG. 2, in which only the die heating section is shown, for purposes of clarity. Although the other pultrusion apparatus components of FIG. 1 are not shown, it is to be understood that the other pultrusion apparatus components are incorporated in the apparatus/method schematically shown in FIG. 2, as would be clearly understood by a person of ordinary skill in the art. The invention comprises utilization of multiple dies instead of a single die and the pultrusion process is carried out in stages. The number of stages required is determined by the nominal thickness of the composite that can be pultruded in one stage and the final thickness of the product required.

The following example assumes that it is possible to produce a composite rod of 1" diameter at the highest line speed, based upon the thermal properties of the resin-fiber mixture and the die size and shape, and that a composite rod of 3" diameter is desired as a final product. To produce a 3" composite rod, three stages are required. As shown in FIG. 2, resin-coated fibers 30 are formed into a 1" composite rod 32, which is cured in the first stage die 34 to an appropriate degree of cure that will enable bonding between itself and the second stage composite layer. Any adhesive material that will promote bonding between the cured product and the second stage composite layer may be utilized, for example by coating the 1" cured composite rod 32 leaving the first stage die 34 with an adhesive. Also, if required, the temperature of the cured product can be controlled by cooling the product before entering the next stage.

The 1" cured composite rod 32 enters the second stage die 36 along with the resin impregnated fibers 38. The second stage die 36 has a 2" diameter die opening in order to produce a 2" cured composite rod 40 which exits stage 2.

Similarly, the 2" cured composite rod 40 enters the third stage die 42 along with the resin impregnated fibers 44. The third stage die 42 has a 3" diameter die opening in order to produce a 3" cured composite rod 46 which exits stage 3 as the final finished product.

Figure 3:
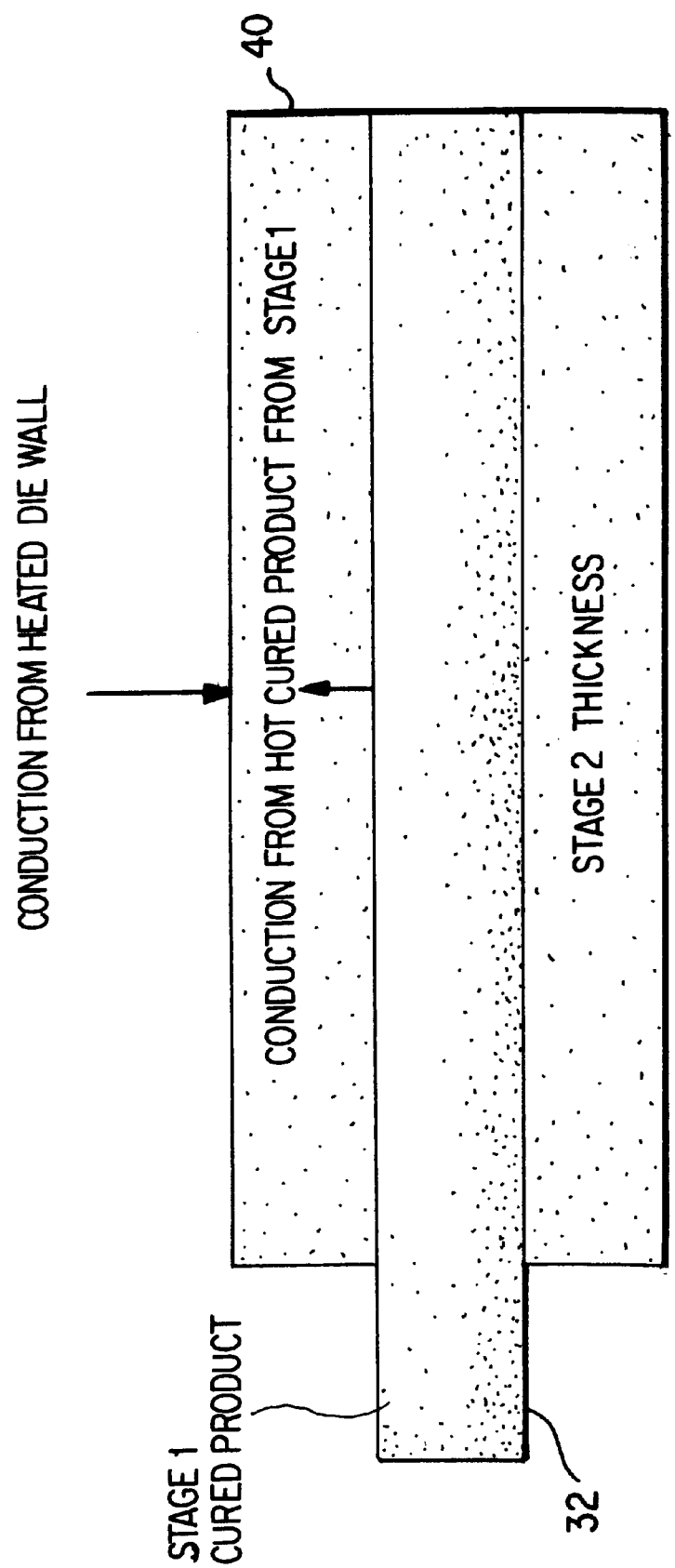
FIG. 3 is a schematic view showing a heat transfer process in the stages following the first stage curing, according to a preferred embodiment of the present invention.

A major significance of the present invention is depicted in FIG. 3, which illustrates heat transfer in the second stage curing. As shown in FIG. 3, the 1" cured composite rod 32 from stage 1 is hot and continues to cure after it leaves the first stage die. The second stage resin impregnated fibers are cured by heat transfer occurring not only externally from the wall of the second stage heated die, but also internally from the hot cured composite rod 32 from stage 1, to form the 2" cured composite rod 40. This dual heating reduces the effective time required for heat conduction, and curing progresses rapidly. This reduces the length of the die required for stage 2. The process is the same in the subsequent stages.

Although the apparatus/method shown in FIG. 2 does not include the apparatus for drawing the fiber/resin mass is through the dies or any pre-forms between the stages, it is to be understood that the apparatus shown in FIG. 1 is to be implemented therein. Contemplated design variations include the following: (a) each stage has an independent fiber feeding station and corresponding resin impregnation system; (b) the fiber is impregnated with resin via a resin bath or by resin injection into the die; and (c) fiber/resin mass is supplied from a single system to all the stages. The apparatus can be designed such that all the heated dies are mounted on the same bed or multiple pultrusion machines can be arranged to operate in series to achieve the same without requiring new designs. The former approach is for designing new machines and the latter approach is for utilizing existing machines. Based on the disclosure herein, those of ordinary skill in the art of pultrusion will clearly understand how to design the process and the apparatus of the present invention.

This invention may advantageously be used to form a product having a non-uniform cross-section in steps. For example, in the case of desired product having a house-shaped cross-section (i.e., rectangular cross-section below and triangular cross-section above), the rectangular cross-section may be formed in the first die stage, with the triangular cross-section being formed and added to the cured rectangular cross-section product in the second die stage. The second die opening comprises the house-shaped cross-section in order to accommodate the cured rectangular product from the first die stage as well as the resin-coated fiber which is pulled through the triangular portion of the house-shaped cross-section to form the final product. In this case, only the surface of the second die which comprises the triangular portion of the house-shaped cross-section need be heated, since the rectangular portion has already been cured in the first heated die. However, it is possible to also heat the surface of the second die which comprises the rectangular portion, for example at a lower temperature, in order to further cure the rectangular product. This would allow the first heated die to be shorter in length. In this case, it is advantageous to have an interface that is a large as possible between the rectangular cross-section and the triangular cross-section in order to provide a stronger bond therebetween and to provide optimal heat transfer therebetween. However, it is to be clearly understood that the subsequent pultruded layers can be attached at any desired location on an exterior surface of the cured pultruded product coming from an adjacent previous die stage.

This invention presents multiple opportunities besides enabling the production of thick structural composites. One opportunity is for producing hybrid composites. Depending upon the application, the reinforcing fibers in each stage can be varied instead of using the same fiber for all stages. Less expensive fibers can used in the non-critical sections of the product and more suitable fibers can be used for the critical sections of the same product. Another opportunity is for producing hybrid polymer composite (using more than one resin system), which is not otherwise possible with a single stage pultrusion. With the present invention, the resin type as well as fiber type can be varied in one or all stages as required by a specific application. For example, in the case of an application where a structure needs to withstand a very corrosive environment and the corrosion-resistant resin for this application is very expensive, another resin which is less expensive but cannot withstand the corrosive environment may be used for producing the core of the structure, with the corrosion-resistant expensive resin being used only for the outer layer. The invention can also be used for producing hollow or solid pultruded products or pultruded products with a core (hollow or solid).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of producing a pultruded product, comprising:

pulling a first fiber coated with a first resin through a first heated die having a first die opening, a first product emerging from said first heated die; and subsequently pulling said first product and a second fiber coated with a second resin through a second heated die having a second die opening which is larger than said first die opening.

2. A method according to claim 1, further comprising pulling a product emerging from said second heated die and a further fiber coated with a further resin through at least one further heated die, each of said further heated dies having a die opening which is larger than the die opening of an adjacent previous heated die.

3. A method according to claim 1, wherein said first product is essentially centrally located in said second die opening as the first product is pulled through said second heated die, such that said second fiber coated with a second resin forms a layer exterior of said first product.

4. A method according to claim 3, wherein said layer is cured from an exterior side by heat from said second heated die, and wherein said layer is cured from an interior side by heat from said first product.

5. A method according to claim 1, wherein said second die opening comprises a cross-section which includes a first area corresponding to a cross-section of said first die opening for accommodating said first product and a second area located adjacent said first area for accommodating said second fiber coated with a second resin, said first area being contiguous with said second area.

6. A method according to claim 5, wherein said second fiber coated with a second resin is cured by heat from a surface of said second heated die defining said second area, and wherein said second fiber coated with a second resin is cured by heat from said first product.

7. A method according to claim 1, wherein said first fiber and said second fiber are identical.

8. A method according to claim 1, wherein said first resin and said second resin are identical.

9. A method according to claim 7, wherein said first resin and said second resin are identical.

10. A method according to claim 1, wherein said act of pulling and said act of subsequently pulling are conducted as a continuous operation.

11. A method according to claim 1, wherein said second fiber coated with a second resin forms a layer surrounding said first product.

12. A method according to claim 1, wherein at least one of said first resin and said second resin is injected into said first heated die and said second heated die, respectively.

* * * * *